United States Patent [19]
Bright

[11] Patent Number: 4,749,203
[45] Date of Patent: Jun. 7, 1988

[54] REINFORCING CARRIERS FOR TRIMMING AND SEALING STRIPS AND THE LIKE

[75] Inventor: Robert G. Bright, Viersen, Fed. Rep. of Germany

[73] Assignee: Draftex Industries Limited, Edinburgh, Scotland

[21] Appl. No.: 904,106

[22] Filed: Sep. 4, 1986

[30] Foreign Application Priority Data

Oct. 17, 1985 [GB] United Kingdom ............... 8525571

[51] Int. Cl.⁴ ..................... E06B 7/22; F16J 15/16
[52] U.S. Cl. ........................... 277/184; 49/491; 52/716; 277/205; 277/235 R; 428/122
[58] Field of Search .............. 52/716; 49/490, 491; 277/205, 164, 138, 140, 215, 235 R, 179, 226, 184, 9; 428/122

[56] References Cited

U.S. PATENT DOCUMENTS

| | | | |
|---|---|---|---|
| 2,554,452 | 5/1951 | Bright | 49/491 |
| 2,785,030 | 3/1957 | Olson | 277/140 |
| 3,091,821 | 6/1963 | Cook . | |
| 3,165,793 | 1/1965 | Lynch | 49/491 X |
| 3,167,825 | 2/1965 | Zoller . | |
| 3,191,946 | 6/1965 | Hamm | 277/138 |
| 3,665,646 | 5/1972 | Niemanns | 49/490 |
| 3,706,173 | 12/1972 | Taylor | 49/490 X |
| 4,010,573 | 3/1977 | Andrzéjewski | 49/498 X |
| 4,143,497 | 3/1979 | Offenbacher | 49/490 X |
| 4,188,424 | 2/1980 | Ohno et al. | 49/490 X |
| 4,194,747 | 3/1980 | Nisper | 277/140 |
| 4,348,443 | 9/1982 | Hein | 428/122 |
| 4,447,065 | 5/1984 | Dupny et al. | 49/491 X |

FOREIGN PATENT DOCUMENTS

| | | |
|---|---|---|
| 645558 | 11/1950 | United Kingdom . |
| 680973 | 10/1952 | United Kingdom . |
| 1115527 | 5/1968 | United Kingdom . |
| 1531058 | 11/1978 | United Kingdom . |
| 2026579 | 2/1980 | United Kingdom . |

Primary Examiner—Allan N. Shoap
Attorney, Agent, or Firm—Leydig, Voit & Mayer

[57] ABSTRACT

A metal carrier for a channel-shaped sealing strip is disclosed. The carrier is of continuous construction but is formed with assymetrically arranged slots. The slots are of a first type and a second type, each slot of the first type extending from a particular one of the distal edges of the channel, through the entire corresponding side of the channel, through the entire base of the channel and through part of the opposite side of the channel but stopping short of the distal edge of the opposite side. Each slot of the second type extends from the distal edge of the said opposite side, entirely through that side and through part only of the base. The slots of the first and second types alternate along the length of the carrier. The slots permit the carrier to be easily curved about an axis or axes extending vertically. This makes the carrier particularly suitable for use in a sealing strip for an engine compartment or luggage trunk opening in a motor vehicle body. The slots also permit the carrier to be compressed slightly lengthwise, thus enabling its overall length to be adjusted to suit the length of the mounting flange to which it is to be fitted. The assymetric arrangement of the slots results in one side of the carrier being relatively more stretchable and compressible than the other.

5 Claims, 2 Drawing Sheets

1

REINFORCING CARRIERS FOR TRIMMING AND SEALING STRIPS AND THE LIKE

BACKGROUND OF THE INVENTION

The invention relates to reinforcing carriers for trimming and sealing strips, particularly though not exclusively for use in trimming and sealing around openings in motor vehicle bodies.

It is known to produce such strips in channel-shaped form for embracingly gripping flanged joints such as run around the openings in motor vehicle bodies. Such channel-form strips may be made of flexible material within which is embedded a channel-shaped reinforcing carrier such as made of metal. Various forms of metal carrier are known. Such carriers have to be sufficiently strong to perform their desired reinforcing function. However, they must also be sufficiently flexible to allow the strip to be curved to suit curves in the flanged joint which it embraces. The flanged joint may lie in the plane of, or parallel to the plane of the actual opening; this generally applies to door or window openings in vehicles. Instead, however, the flanged joint may lie generally transverse or perpendicular to the plane of the opening; this applies normally to luggage boot and engine compartment openings. The orientation of the flanged joint with respect to the opening determines the manner in which the carrier has to bend to follow curves in the opening. The carriers to be more specifically described are particularly suitable for luggage boot or engine compartment openings.

BRIEF SUMMARY OF THE INVENTION

According to the invention, there is provided a reinforcing carrier for a sealing strip, comprising reinforcing material extending continuously along the sealing strip but provided with a plurality of slots each of which extends from a respective distal edge of the reinforcing material but stops short of the other distal edge thereof.

According to the invention, there is also provided a channel-shaped metal reinforcing carrier for a channel-shaped trimming or sealing strip, the carrier being in the form of a metal channel with slots through it and arranged regularly along its length, the slots being of a first type and a second type, each slot of the first type extending from a particular one of the distal edges of the channel, through the entire corresponding side of the channel, through the entire base of the channel and through part of the opposite side of the channel but stopping short of the distal edge of the opposite side, each slot of the second type extending from the distal edge of the said opposite side, entirely through that side and through part only of the base, the slots of the first and second types alternating along the length of the carrier.

BRIEF DESCRIPTION OF THE INVENTION

A reinforcing metal carrier embodying the invention and a sealing strip incorporating such a carrier and for fitting to a luggage compartment opening on a motor vehicle will now be described, by way of example only, with reference to the accompanying diagrammatic drawings in which.

DESCRIPTION OF PREFERRED EMBODIMENTS

Figure 3:
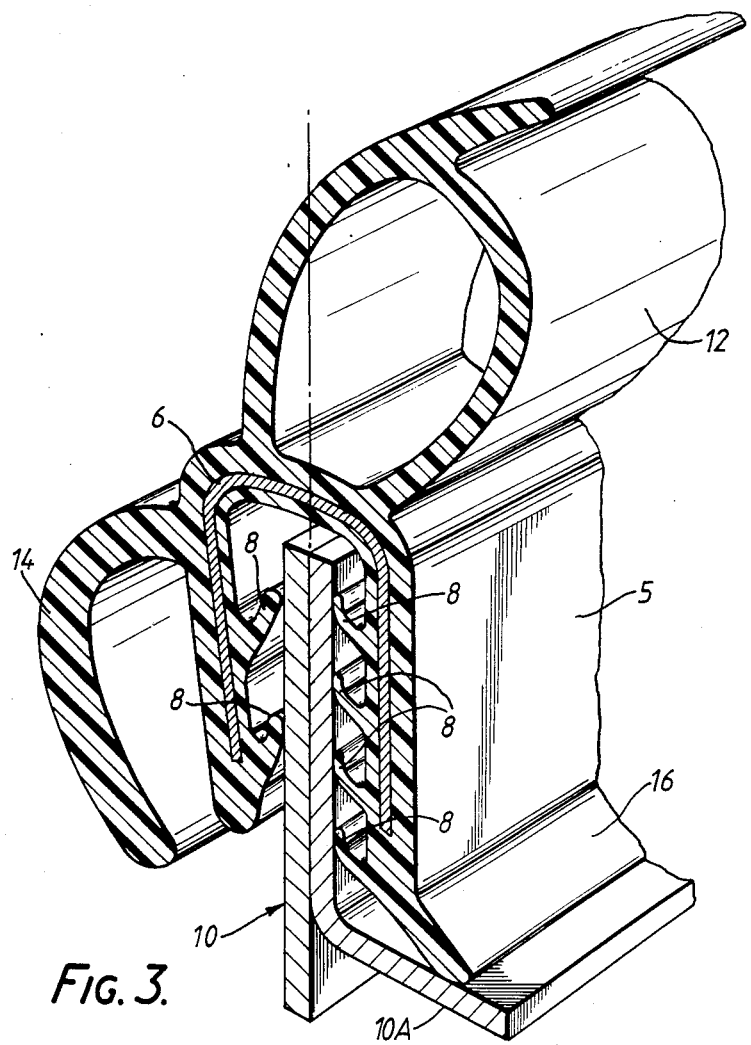
FIG. 3 shows a perspective cross-sectional view of the strip incorporating the carrier.

As shown in FIG. 3, the finished sealing strip is of channel-shaped form and is made of flexible material 5 which may be plastics or rubber material. Embedded within the material 5 is a longitudinally extending channel-shaped metal carrier 6 to be described in more detail below. Advantageously, the material 5 is formed over the carrier 6 by means of a known cross-head extruder process which extrudes the material 5 through a die and over the metal carrier 6. The extrusion process advantageously forms the material 5 in such a manner as to provide integral gripping lips 8 which run longitudinally along the channel and extend from opposite inside walls thereof. There may be greater or lesser numbers of lips than shown in FIG. 3, with equal or unequal numbers of lips on each inside wall of the channel. The lips on opposite sides of the channel may be of different shape. There may in fact be no lips at all or no lips on one inside wall. The extrusion process may form the lips so that they are not of the same hardness as the remainder of the flexible material 5. In use the lips 8 help to secure the strip to the flanged joint 10.

As shown in FIG. 3, the strip has a main generally tubular seal 12 running along its inverted base. This seal is shown extruded integrally with the material 5 but could be separate and adhesively secured in position. It can have a different hardness from the material 5 and advantageously is of foamed or cellular construction.

It will be apparent that the seal 12 provides a seal onto which the lid of the luggage compartment closes.

In addition, the strip has a longitudinal lip 14 extending from one outside wall of the channel. Again the lip is preferably extruded integrally with the material 5. The purpose of the lip 14 is to retain the internal trim fabric within the luggage compartment.

Finally, the strip has a longitudinal secondary seal 16. The purpose of this is to provide a seal against the surround part 10A to help to prevent water and the like seeping up inside the channel of the strip.

Figure 1:
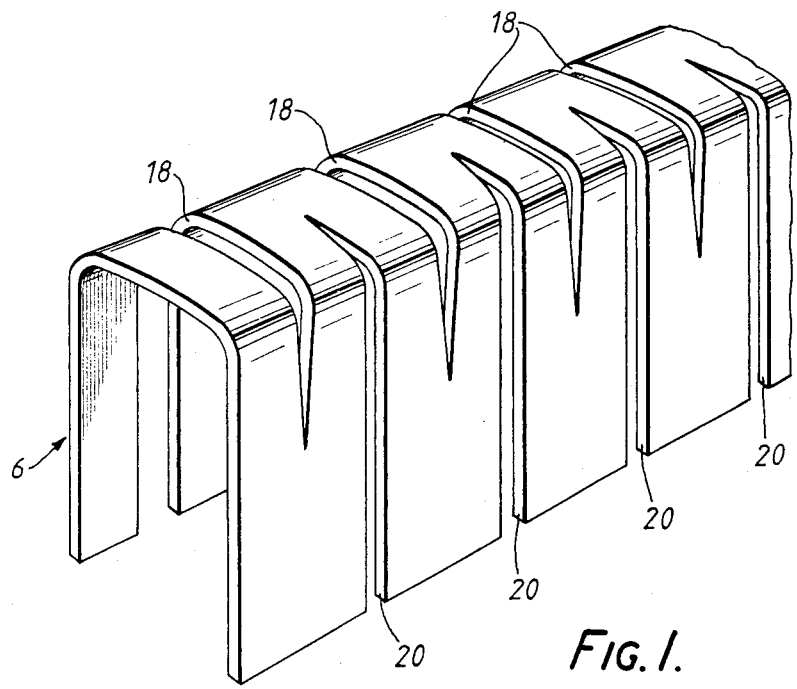
FIG. 1 shows a perspective view of the metal carrier.

FIG. 1 illustrates the carrier 6 in perspective view, without the extruded material 5. As shown in FIG. 1, the carrier 6 is in the form of a continuous metal channel but with through slots 18 alternating with through slots 20. Each slot 18,20 extends from a respective distal edge of the channel, up (as viewed in the Figure) that side of the channel and at least part way across the base of the channel. It will be seen that the slots 18 in fact extend entirely across the base of the channel and part way down (as viewed in the Figure) the opposite channel side. However, each slot 20 stops about half way across the base of the channel.

The arrangement of the slots 18,20 is therefore basically assymetric.

The arrangement of the slots 18,20 in the carrier is advantageous because, when the carrier is incorporated into the sealing strip as shown in FIG. 3, the assymetric arrangement of the slots enables the carrier to be easily curved about an axis or axes extending vertically (as viewed in FIG. 3). The carrier is thus particularly suited for reinforcing sealing strips which need to be curved in this fashion, in particular (and as explained) for strips fitted to luggage compartment or engine compartment openings. Such openings contrast with door openings in vehicle bodies where the flanged joints lie in a plane or planes parallel to the plane of the opening.

Figure 4:
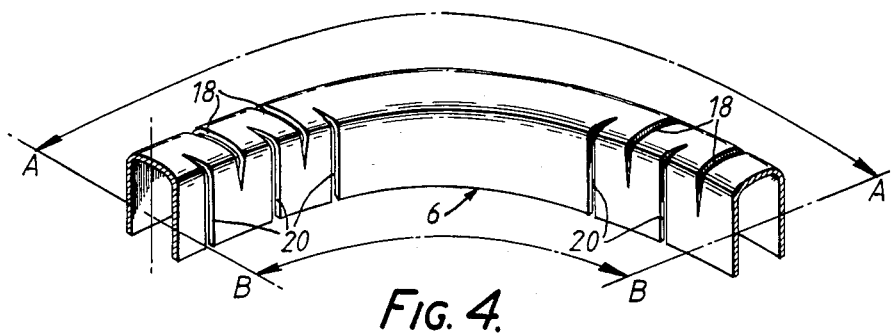
FIG. 4 shows a perspective view of the carrier of FIG. 1 but in the attitude it adopts when curved about a vertical axis.

More specifically, the assymetric arrangement of the slots 18,20, enables one side of the carrier to compress or stretch more than the other when the strip is bent to follow a curve in the opening to which it is fitted. Thus, as shown in FIG. 4, the side of the carrier on the outside of the bend (A—A) has the slots 18 and thus can stretch relatively easily (similarly, it could be compressed relatively easily if on the inside of the bend). The other side of the carrier (on the inside of the bend, (B—B), in this case) has the slots 20 and is thus relatively less stretchable or compressible. These capabilities of the carrier can be used to suit whatever combination of seals is used. Thus, it would be advantageous to place the trim retaining lip 14 on the side of the carrier having the slots 20. This is because the slots tend to resist stretching and compression and would prevent puckering of the lip 14 at curves.

In addition, however, the carrier illustrated is advantageous because the slots permit it to be compressed lengthwise to at least a certain extent. This is advantageous because it enables the overall length of the sealing strip to be adjusted to suit the length of the flanged joint to which it is to be fitted. It has been found that sealing strips can change in length during storage or handling and/or the peripheral lengths of the openings to which they are to be fitted may not be accurate. It is therefore highly desirable that the fitter should be able to adjust the length of a sealing strip to suit the opening. This is permitted by the construction shown.

Although the carrier shown is slightly compressible, it may be advantageous to prevent it stretching. For this purpose, an inextensible element such as a thread or wire may be arranged to run along its length, within the flexible material 6, this inextensible element being either secured or not secured to the carrier itself.

The carrier illustrated is also advantageous because it is of one-piece construction that is, it does not comprise a series of separate U-shaped elements).

Such separate elements are not so easy to handle. Normally, such a carrier would initially be made of one-piece form (so as to permit it to be fed into the extruder), and it would then be necessary to employ a separate process to separate the elements (such as by breaking frangible interconnecting links between them). This is avoided by the carrier illustrated.

Figure 2:
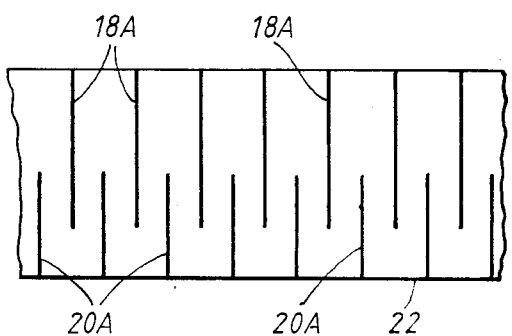
FIG. 2 shows a metal blank from which the carrier may be produced, at an early stage in the manufacturing process.

The carrier illustrated may be produced in a number of ways. For example, it may be produced by simply cutting out the slots, by means of a press for example, from a longitudinal metal blank. However, it may be better to produce it by providing slits 18A,20A through a flat metal blank 22, such as shown in FIG. 2. By means of a rolling and channel-forming action, the metal blank is stretched, resulting in the slits 18A,20A being opened out to become the slots 18,20 respectively. This process is advantageous because no metal is wasted.

This process takes place preferably before the carrier has been passed through the extruder and covered with the extruded material 5.

What is claimed is:

1. A sealing strip for bendably mounting on a flange about an axis, comprising a channel-shaped flexible material and a reinforcing carrier embedded within the flexible material, the carrier comprising reinforcing material extending continuously along the sealing strip but provided with a plurality of slots, the reinforcing material being in the form of a channel of generally U-shaped cross section having a base integrally connected to a first and second side wall, each slot running transversely to the direction of extension of the channel and extending from a distal edge of a side wall into the base of the reinforcing material but stopping short of the distal edge of the other side wall, the slots being of a first type and of a second type, each slot of the first type extending from the distal edge of the first side wall across the base of the channel to the second side wall and each slot of the second type extending from the distal edge of the second side wall only part way across the base so that the reinforcing carrier is less elastically compressible in a longitudinal direction along said second side wall than along said first side wall to minimize puckering of the flexible material adjacent the second side wall when the sealing strip is bent about the axis with the second side wall closest to the axis.

2. A sealing strip according to claim 1, in which the slots of the first and second types alternate along the length of the carrier.

3. A sealing strip according to claim 1 in which each slot of the second type is narrower than each slot of the first type.

4. A sealing strip according to claim 1 including a sealing part of soft flexible material running along and secured to the channel-shaped flexible material on the outside of the base of the channel adjacent the second side wall.

5. A sealing strip according to claim 1 wherein said first type slots extend partially into said second side wall.

* * * * *